: US 9,275,501 B2
(45) Date of Patent: Mar. 1, 2016

(12) United States Patent
Gross

(54) METHOD FOR CONTROLLING AT LEAST ONE FUNCTION OF A MOTOR VEHICLE

(71) Applicant: Dr. Ing. h.c. F. Porsche Aktiengesellschaft, Stuttgart (DE)

(72) Inventor: Manuel Gross, Hessigheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/520,459

(22) Filed: Oct. 22, 2014

(65) Prior Publication Data

US 2015/0142212 A1 May 21, 2015

(30) Foreign Application Priority Data

Nov. 18, 2013 (DE) .......................... 10 2013 112 679

(51) Int. Cl.
*G07C 5/00* (2006.01)
(52) U.S. Cl.
CPC ...................... *G07C 5/008* (2013.01)
(58) Field of Classification Search
CPC .. H04B 1/3822; H04B 7/18545; G07C 5/008; H04W 60/04
See application file for complete search history.

(56) References Cited

U.S. PATENT DOCUMENTS

| 6,663,010 | B2* | 12/2003 | Chene et al. ..................... 236/51 |
| 8,670,897 | B1* | 3/2014 | Ralson ............................. 701/36 |
| 2009/0131131 | A1* | 5/2009 | Wilson ....................... 455/575.9 |
| 2009/0195370 | A1* | 8/2009 | Huffman ................. B60R 25/04 340/426.13 |
| 2011/0124341 | A1* | 5/2011 | Kubo et al. .................... 455/440 |
| 2012/0191522 | A1* | 7/2012 | McLaughlin et al. ..... 705/14.23 |
| 2013/0012123 | A1* | 1/2013 | DeLuca ........................... 455/39 |
| 2013/0211623 | A1* | 8/2013 | Thompson et al. ............... 701/2 |
| 2014/0058586 | A1* | 2/2014 | Kalhous et al. .................. 701/2 |
| 2014/0200765 | A1* | 7/2014 | Waeller ........................... 701/36 |
| 2014/0256304 | A1* | 9/2014 | Frye ...................... H04W 4/206 455/418 |
| 2014/0309842 | A1* | 10/2014 | Jefferies et al. .............. 701/31.5 |
| 2014/0310031 | A1* | 10/2014 | Ricci ................................. 705/5 |
| 2015/0046022 | A1* | 2/2015 | Bai ........................ G07C 5/008 701/31.5 |
| 2015/0088339 | A1* | 3/2015 | Fisher ..................... A61G 3/00 701/2 |

FOREIGN PATENT DOCUMENTS

| DE | 10109810 A1 * | 9/2002 | ............ G08C 17/02 |
| DE | 102009018591 A1 * | 11/2010 | |
| DE | 102011050529 | 11/2012 | |
| WO | 2011034441 | 3/2011 | |
| WO | WO 2012010210 A1 * | 1/2012 | |

* cited by examiner

*Primary Examiner* — Rodney Butler
(74) *Attorney, Agent, or Firm* — Gerald E. Hespos; Michael J. Porco; Matthew T. Hespos

(57) ABSTRACT

A method for controlling a function of a motor vehicle (18) employs a use module (4) at a storage location (6, 8) for a device outside the motor vehicle (18). The use module (4) and the storage location (6, 8) have recognition interfaces (10, 12, 14). The motor vehicle (18) has a first communication module (22), and a second communication module (16) is provided for the use module (4) and for the storage location (6, 8). The recognition interfaces make contact when the use module (4) is at the storage location (6, 8). If a storage location (28, 32) change is registered for the use module (4), a message with an instruction to perform the function of the motor vehicle (18) is transferred from the second communication module (16) for the use module (4) and the storage location (6, 8) to the first communication module (22) of the motor vehicle.

25 Claims, 2 Drawing Sheets

METHOD FOR CONTROLLING AT LEAST ONE FUNCTION OF A MOTOR VEHICLE

CROSS-REFERENCE TO RELATED APPLICATION

This application claims priority on German Patent Application No. 10 2013 112 679.0, filed Nov. 18, 2013, the entire disclosure of which is incorporated herein by reference.

BACKGROUND

1. Field of the Invention

The invention relates to a method and a system for controlling at least one function of a motor vehicle.

2. Description of the Related Art

A user of a technical device can initiate a function of the device by manually actuating a module, for example by pressing a button. A module of this type also can be designed as part of a remote control that can exchange information wirelessly with the device. In this respect, it is also known for a door of a motor vehicle to be unlocked and locked by a remote control integrated into a key of the motor vehicle.

US2014/0200765 A1 describes vehicle with a comfort system and a control device for controlling different vehicle systems and vehicle functions, at least one vehicle communication device for exchanging data via wireless communication and a plurality of identification modules arranged in the vehicle. Each identification module comprises an identifier readable in a proximity area that is allocated to a respective installation location of the identification module. The vehicle control device is designed to set up a communication connection via the vehicle communication device to a mobile device, to receive an identifier read out by the mobile device via the communication connection and, selectively, depending on the received identifier, to permit or prevent a control and use of individual or all vehicle functions and vehicle systems via the mobile device and the communication connection.

DE 10 2011 050 529 A1 discloses a recognition device for providing an access function and a driving authorization function of a vehicle. The recognition device comprises at least one communication means for communication with an identification device for the vehicle and at least one control unit that is in signal-communicating contact with the at least one communication means. The at least one communication means and the at least one control unit are configured to provide both the access function and the driving authorization function for the vehicle.

WO 2011/034441 A1 discloses a system for a universal operating device for use of a mobile telephone. The operating device is connected to an instrument panel of a motor vehicle. Furthermore, the operating device has a charging socket via which the operating device can be connected to the mobile telephone, and is designed to communicate with an external communication device.

SUMMARY OF THE INVENTION

The invention relates to a method for controlling, operating and/or regulating at least one function of a motor vehicle. The method employs a use module that can be disposed at least at one storage device. The at least one storage device is allocated to a location outside the motor vehicle. The use module and the at least one storage device in each case comprise a recognition interface. The motor vehicle furthermore comprises a first communication module. At least one, usually shared, second communication module is provided for the use module and for the at least one storage device. The at least one second communication module thus is allocated to the use module and/or the at least one storage device. This second communication module is disposed in either the use module or the at least one storage device. The recognition interface of the use module and the recognition interface of the at least one storage device make contact during performance of the method when the use module is disposed at the at least one storage device. If a change of storage location is registered for the use module, a message with an instruction to perform the at least one function of the motor vehicle is transferred from the at least one second communication module to the first communication module of the motor vehicle. The instruction comprises information relating to the at least one function that is to be carried out, how, and at what time.

Consequently, a performance of the at least one function is initiated automatically depending on a change of a position of the use module in relation to a storage device via the instruction comprised by the message when the position of the use module is changed in the change of storage location in relation to the at least one storage device.

Normally, a change of storage location is registered and the message with the instruction to perform the at least one function of the motor vehicle is transferred when the use module is distanced from a storage device. Alternatively or additionally, a change of storage location is registered for the use module and the message with the instruction to perform the at least one function of the motor vehicle is transferred when the use module is disposed at the at least one storage device through transportation to the at least one storage device. Alternatively or additionally, a change of storage location is registered for the use module and the message with the instruction to perform the at least one function of the motor vehicle is transferred when the use module is carried or transported past the at least one storage device. Thus, the recognition interface of the use module and the recognition interface of the at least one storage device come into contact for a time period, wherein the use module, in the case of a "passing-by transportation" of this type, initially is disposed at the storage device and, following a, usually short, time period of fractions of a second or a maximum of a few seconds, is again promptly distanced.

The recognition interface of the use module and the recognition interface of the at least one storage device then come into contact with one another, wherein the use module is deemed to be disposed at the at least one storage device when a distance between the recognition interface of the use module and the recognition interface of the at least one storage device is at most as great as a minimum distance provided for this purpose. A minimum distance of this type depends, for example, on a range of signals that are exchanged between the recognition interfaces for the reciprocal establishment of the contact, usually via electromagnetic waves. This minimum distance may depend in configuration on a strength of the exchanged signals, wherein the strength becomes less with an increasing distance of the two recognition interfaces from one another. Accordingly, it is possible to define a coming into contact of the recognition interface of the use module with the recognition interface of a storage device on the basis that the signals exchanged between the recognition interfaces on reception by a recognition interface have a strength that is at least as great as a minimum strength provided for the signals. Normally, the distance between the recognition interfaces can be determined by the strength of the transferred and/or exchanged signals.

Performance of the method involves determining at least one characteristic of the change of storage location. For this purpose, a time when the change of storage location is carried out can be determined as the at least one characteristic of the change of storage location.

The storage device out of a plurality of storage devices at which or in relation to which the change of storage location is carried out can be determined as the at least one characteristic of the change of storage location. Here, the at least one storage device is assigned to at least one stationary location, which may be a home place and/or a workplace of a user of the motor vehicle. The at least one stationary location may be designed as a passage, for example a gateway, between two areas of a location. The procedure of the change of storage location also can be determined as the at least one characteristic of the change of storage location. A distinction is made in terms of whether the use module is at a storage device assigned to a stationary location, is at a distance from the storage device, or is transported past the storage device. With the instruction, a type of the at least one function to be performed is predefined depending on the at least one characteristic of the change of storage location. To do this, a time for a performance of the at least one function to be performed can be predefined with the instruction, depending on the at least one characteristic of the change of storage location.

This may mean that the at least one function is to be performed at an immediate time, depending on the at least one characteristic of the change of storage location. Alternatively, the at least one function can be performed at a future time depending on the at least one characteristic of the change of storage location, wherein a time period until the occurrence of this future time is determined. Depending on whether the use module is disposed at the storage device or is distanced from the storage device, a forecast is determined for a type of the function to be performed and/or a forecast for the either immediate or future time for the performance of the function. The type of function to be performed at a time normally depends also on the time of day and the day of the week on which the change of storage location is carried out. A decision is made on the type of the at least one function to be performed and the time for its performance depending on the change of storage location. Information on the type of the function and the time is conveyed with the instruction in the message and thus is predefined.

A change of storage location signal is generated by at least one recognition interface of the recognition interface of the use module and the recognition interface of the at least one storage device, at the time when the change of storage location takes place.

The change of storage location signal can be designed as a use module distance signal when the use module is distanced from the storage device during the change of storage location and a contact between the recognition interface of the use module and the recognition interface of the storage device is interrupted when the recognition interfaces are distanced from one another by a distance that is greater than the minimum distance, and/or when the strength of signals exchanged between the recognition interfaces is less than the provided minimum strength for this purpose. Alternatively, the change of storage location signal can be a use module disposition signal when the use module is disposed at the storage device during the change of storage location and the recognition interface of the use module and the recognition interface of the at least one storage device come into contact, wherein the recognition interfaces are distanced from one another at most by the minimum distance and/or the exchanged signals are at least as strong as the minimum strength provided for this purpose. The at least one characteristic of the change of storage location also can be defined by the change of storage location signal.

The at least one function can be that an air-conditioning system of the motor vehicle is switched on. Thus, a passenger compartment of the motor vehicle is either heated or cooled depending on an internal temperature of the motor vehicle and/or an external temperature. The at least one function similarly can be that an electrical energy store of the motor vehicle is charged. The time for performing the respective function is determined depending on how much time is required to achieve a required temperature of the passenger compartment of the motor vehicle and/or to charge the electrical energy store.

The method usually is carried out for a motor vehicle that has an electric motor as the drive device and accordingly can be an electric vehicle or hybrid vehicle.

In one possible embodiment of the method according to the invention, a home place of the user is defined as the first stationary location and a workplace of the user is defined as the second stationary location. A mobile telephone of the user is used as the use module. If the user is in his home place and leaves the home place in the morning before work, he takes the mobile telephone with him as the use module. When the mobile telephone is distanced from the home place, a change of storage location takes place, whereupon a message is generated with an instruction indicating that the motor vehicle of the user must be air-conditioned immediately before the journey to the workplace. Following an arrival at the workplace, a second change of storage location takes place when the use module is removed from the motor vehicle, and a third change of storage location is carried out when the use module is disposed at a storage device at the workplace. If, for example, it is known how long the user will remain in the workplace, a message can be generated during the third change of storage location specifying that the motor vehicle must be air-conditioned at a planned leaving-off time. An instruction of this type can also be generated at the latest when the user leaves the workplace at his leaving-off time and a fourth change of storage location is carried out through the distancing of the use module from the workplace, on the basis of which a message with an instruction for the immediate air conditioning of the motor vehicle is transferred to the communication module of the motor vehicle.

The system of the invention is designed to control at least one function of a motor vehicle and comprises a use module and at least one storage device for the use module. The storage device is allocated in each case to a location outside or external to the motor vehicle, and at least two communication modules. The use module and the at least one storage device in each case comprise a recognition interface. The motor vehicle has a first communication module as a further system component. At least one second communication module is provided for the use module and for the at least one storage device. The recognition interface of the use module and the recognition interface of the at least one storage device are designed to make contact when the use module is or becomes disposed at the at least one storage device. If a change of storage location is to be registered for the use module, the at least one second communication module for the use module and for the at least one storage device is designed to transfer a message to the first communication module of the motor vehicle with an instruction with information for performing the at least one function of the motor vehicle.

At least one storage device is disposed on and/or in the respective stationary location outside the motor vehicle. Each storage device outside the motor vehicle can be allocated to a stationary location, for example a home place, such as a house, and/or an apartment, but also the workplace of the user outside the motor vehicle, which is defined in this case as a mobile device.

The system may have a plurality of storage devices or only one storage device for the use module. At least one of the storage devices may be a device outside the motor vehicle. One of the storage devices may be disposed in the motor vehicle.

A storage device for the use module may be located in the motor vehicle, normally in its passenger compartment, and may have a recognition interface designed to make contact with the recognition interface of the use module when the use module is in the motor vehicle and the recognition interface of the use module has at most the minimum distance from the recognition interface of the motor vehicle.

The at least one second communication module for the use module and for the at least one storage device is allocated to the use module. This second communication module is disposed in the use module. Alternatively or additionally, the at least one second communication module for the use module and for the at least one storage device is allocated to the at least one stationary location. At least one shared second communication module thus is provided for the use module and/or for the at least one storage location. It is also possible for a second communication module to be allocated to both the use module and to each stationary location.

The recognition interface of the use module and the recognition interface of the at least one storage device are designed to make contact with one another through exchange of electromagnetic waves. Alternatively or additionally, the recognition interface of the use module and the recognition interface of the at least one storage device are designed to make contact via a mechanical and/or electrical connection. One of the two recognition interfaces may be a plug module and the other as a socket module. Alternatively or additionally an electrical contact may be provided between the two recognition interfaces if signals are exchanged between respective contacts of the recognition interfaces via a current-conducting connection.

The use module of the system is designed as a mobile, portable device for communication and/or data processing. The use module, accordingly, can be a mobile telephone, such as a smartphone. The use module also can be a key for the motor vehicle. A key of this type can be designed to legitimize or grant access to a passenger compartment of the motor vehicle through mechanical interaction and/or through exchange of electromagnetic waves with a lock of the motor vehicle. Alternatively or additionally, a key of this type is designed to start up the motor vehicle for a journey through mechanical interaction and/or through exchange of electromagnetic waves with an ignition device of the motor vehicle. A function of this key to be provided via exchange of electromagnetic waves can be provided by the aforementioned device for communication and/or data processing.

In the method, the at least one storage device of the use module is used, inter alia, as an indicator for the control, i.e. for the operation and/or regulation, of a motor vehicle designed, for example, as an electric vehicle. The use module is normally designed as a component of an object. In the invention, the use module can also be designed, depending on definition, as an object of this type.

A recognition interface designed as an RFID interface for exchanging information via electromagnetic waves may be assigned to the use module. A recognition device designed as an RFID interface for exchanging information via electromagnetic waves (radio frequency identification) and/or an Internet access, for example via UMTS or TCP/TP, is allocated to the stationary location. The recognition interface may be a component of a device, for example a charging unit, for a use module designed as a component of a mobile telephone, as a component of a door opener, as a component of a coffee maker, etc., where a device of this type is designed as a storage device. The recognition interface is designed for wireless communication through use of electromagnetic waves, irrespective of the device to which it is allocated. Furthermore, the motor vehicle, as a possible storage location for the use module and/or the object that comprises the use module may have a recognition interface of this type.

An alarm function can be provided for the use module if the use module is a component of a mobile telephone or smartphone or cellphone. Furthermore, the use module designed as a component of the mobile telephone can be disposed at a first storage device of a motor vehicle, for example an electric vehicle, and can be assigned to a recognition interface of the motor vehicle. A positioning of the use module at the storage device is recorded via the allocated recognition interface. The radio link provided via electromagnetic waves enables signals and/or data to be exchanged between the recognition interface of the use module and the recognition interface of the storage device. Data provided via the recognition interface can be stored in a memory of the use module or a memory of the object in which the use module is disposed.

The use module that is distanced from the storage device in the motor vehicle may be transported to a different, second storage device in a stationary location, for example in a house and/or an apartment, and is disposed at the second storage device in the stationary location, which may be a charging station for the object or the use module. A message with which the alarm function of the object and/or the use module is activated is transmitted from the recognition interface to the use module as soon as the use module is recognized via a recognition interface of the second storage device as being locally allocated to this second stationary location. The future time at which a new journey that is to be made regularly is planned for the motor vehicle is queried to implement the alarm function. The alarm function can also access a calendar to determine the time to avoid misinformation at weekends and on leave days.

A notification and/or a query can be transferred to a user of the object or use module, via which the user is asked about the future time at which the motor vehicle will again be needed. Irrespective of how a time for a start of a next, planned journey is determined, a message is delivered to the first communication module of the motor vehicle with an instruction indicating when the motor vehicle provisionally is expected to be restarted. The instruction transferred with the message to the first communication module of the motor vehicle may also comprise information relating to weather data, for example an external temperature, and a location of the motor vehicle that is determined via a positioning system, such as, for example, GPS. On the basis of information of this type, the motor vehicle is conditioned for a future journey depending on the planned start time or the alarm time, depending on the location and/or considering meteorological ambient conditions that can be forecast for the planned start time. For example, a measure to air-condition a passenger compartment of the motor vehicle before the planned start time and thus heat or cool the passenger compartment depending on a currently prevailing external temperature and/or internal temperature in the passenger compartment of the motor vehicle. Depending on the difference between a current internal temperature and an internal temperature to be attained at the start time, wherein a difference between at least one of these internal temperatures and the external temperature is also to be taken into account, an intensity of an air conditioning system of the motor vehicle, which may comprise an auxiliary heater, is set to heat or cool the passenger compartment at a time to be determined before the planned start time. If the passenger compartment of the motor vehicle is to be heated, either a continuous heating over a longer time period before the start time or a short pre-heating can be set automatically.

A conditioning of an electric vehicle may also comprise a measure to charge a battery, for example a drive battery, as an electrical energy store, at least sufficiently, and normally completely, via an electricity grid until the planned start time in the case of an electric vehicle feed (vehicle to grid). A present state of charge of the battery is identified and a time period that is needed to charge the battery is determined. A charging of the battery can be carried out automatically during this time period until, at the latest, the planned time for the next journey of the motor vehicle. An electricity price dependent on the time of day can also be taken into account here. Thus, the battery is charged when the electricity price is comparatively low, e.g. lower at night than during the day. With a quantity of electrical energy that is to be charged into the battery until the start time, a length and/or range of the journey beginning at the start time is also to be taken into account. Information on the length and/or range can be recorded automatically from a calendar of the use module.

The start time also can be defined at short notice, which is the case at the latest when the use module is removed from the current storage device and/or is distanced from the current storage device. The start time at which the user will be at the vehicle with the use module is estimated insofar as a distance between the current or last storage device and the motor vehicle is known. In this case, a conditioning of the motor vehicle is started then at the latest, or an already started conditioning is increased, for example by increasing a power of the air conditioning system and/or a power for charging the battery. A specific type of a conditioning of the motor vehicle, such as heating, cooling or charging dependent on the time of day and/or season, can be allocated to one specific stationary location. A specific type of conditioning may additionally be implemented, as in the case of a timer, depending on a time period between the time of the change of storage location and the vehicle start time.

Different storage locations at which the object or the use module is regularly and/or habitually disposed and therefore stored can be defined for the object or the use module. A storage device normally is disposed in the passenger compartment of the motor vehicle. The entire passenger compartment of the motor vehicle can be defined as a possible storage location. Furthermore, at least one further storage device may be disposed in a stationary location, for example in a building such as the apartment or in a workplace of the user. In the case of the workplace, a time-recording clock present there can be defined as a storage device. A message with an instruction relating to a time for an earliest possible journey is delivered to the motor vehicle by the at least one second communication module as soon as the user passes the time-recording clock as a possible storage device with the object designed as the use module before leaving the workplace, and thus transports the use module past the time-recording clock to clock off there. In the event of an arrival in the workplace, a change of storage location similarly takes place when the use module is transported past the time-recording clock.

A current position of the use module is controlled and/or monitored via the at least one storage device so that the use module is located automatically. The time for a next future journey with the motor vehicle can be determined as soon as a position of the use module is changed in terms of the at least one storage device, either through disposition of the use module at this storage device or through distancing of the use module from this storage device in the event of a change of storage location in relation to the stationary locations. Regularly used storage devices, referred to as habitual storage devices, can be employed. Procedures spontaneously carried out and recurring on a regular, daily basis are recorded in the method on the basis of a position of the use module in relation to at least one storage device provided for this purpose. The motor vehicle is conditioned using automatic mechanisms based on the regular procedures. It is thus no longer necessary for a user of the motor vehicle to actively concern himself with specific conditionings of the motor vehicle.

Disposition of a use module designed as, for example, a mobile telephone, key, piece of jewelry, purse or ID card at a storage device designed as a keyholder or bedside table and allocated to the use module, a change of location is carried out and a message with an instruction indicating the function that is to be carried out to condition the motor vehicle at a specified time is transferred to the first communication module of the motor vehicle.

An access to the motor vehicle and/or an opening of the motor vehicle can be controlled via the use module, wherein, in the case where the use module is designed as a component of a mobile telephone, a request for a code, for example a PIN code, is made for legitimation.

Furthermore, an operating mode of a mobile telephone which is designed as a use module or has the use module as a component can be set depending on the storage device. A flight mode, for example, can be set for the mobile telephone when it is disposed at a specific stationary location. Alternatively or additionally, incoming calls can be diverted, for example to a house telephone system, depending on the storage device. Accordingly, a camera of the mobile telephone can be switched off on entry to a work site, wherein an entrance or security gate of the site is defined as the stationary location, and can be switched on again on passing the entrance and on leaving the site. A use module designed as a mobile telephone, which similarly has an interface for the location or position determination via electromagnetic waves can, if necessary, be used as a digital ID card, wherein a passport photograph of the user can be presented on a display. The proposed use module can also be used as a company telephone or for the legitimation of an access authorization.

Through the use of RFID technology in each case for a recognition interface of a storage device and of the use module, a fast and secure identification and location of the use module and therefore the object relative to a stationary location are possible. For this purpose, a transmit and/or receive element is disposed in each recognition interface which is used. A transmit element can be operated here with an active power supply. A receiver element can possibly also be operated without an active power supply. The transmit and/or receive element can be disposed, for example, in a chip of a recognition interface of the storage device or of the use module.

Furthermore, an alarm function which is implemented in a mobile telephone with a use module can be used to initiate the provided conditioning of the motor vehicle via the recognition interface of the storage device. An opening and closing of the motor vehicle can also be carried out automatically via the recognition interface of the use module, wherein the recognition interface in the use module communicates with the recognition interface of the motor vehicle via electromagnetic waves.

On the whole, the method is used for an automatic initiation of an instruction to perform at least one function of the motor vehicle on the basis of a location-specific positioning of the use module, which has an active or passive RFID chip as a recognition interface. It is taken into account here that the use module, which can also be designed as a component of a use object, is habitually frequently stored or disposed at the same storage device. If a storage device of this type that is regularly employed for the use module is similarly equipped with a recognition interface, the disposition of the use module at the storage device, but also the distancing of the use module from the storage device, can also be registered as a change of storage location and the instruction to perform the at least one function can then be provided as an action. The storage device can be designed as a storage tray for the object with the use module or as a charging unit of this object, insofar as the latter is electrically operated.

With the recognition interfaces provided for the use module and the at least one storage device, a remote communication via UMTS or an Internet access can also be implemented. In this case, when a use module designed as a mobile telephone is stored in the motor vehicle, a UMTS call number of the motor vehicle can be transmitted to the mobile telephone or the second communication module of the use module. The mobile telephone is later taken once more out of the motor vehicle and stored at a storage device at home or in the company. On the basis of an access to a calendar of the mobile telephone and/or on the basis of learned data, the alarm function, via which the motor vehicle is conditioned in a timely manner at the time of the planned start, is then started. For this purpose, a corresponding message with a schedule for the conditioning that is to be carried out is sent from the mobile telephone to the first communication module of the motor vehicle. Additionally or alternatively to the conditioning, the initiation of a charging procedure of the drive battery from the stationary electricity grid can be provided when the motor vehicle is designed as a plug-in vehicle.

Further advantages and configurations of the invention can be found in the description and the attached drawings.

The features mentioned above and still to be explained below are obviously usable not only in the respectively indicated combination, but also in other combinations or in isolation, without leaving the framework of the present invention.

DETAILED DESCRIPTION

Figure 1A:
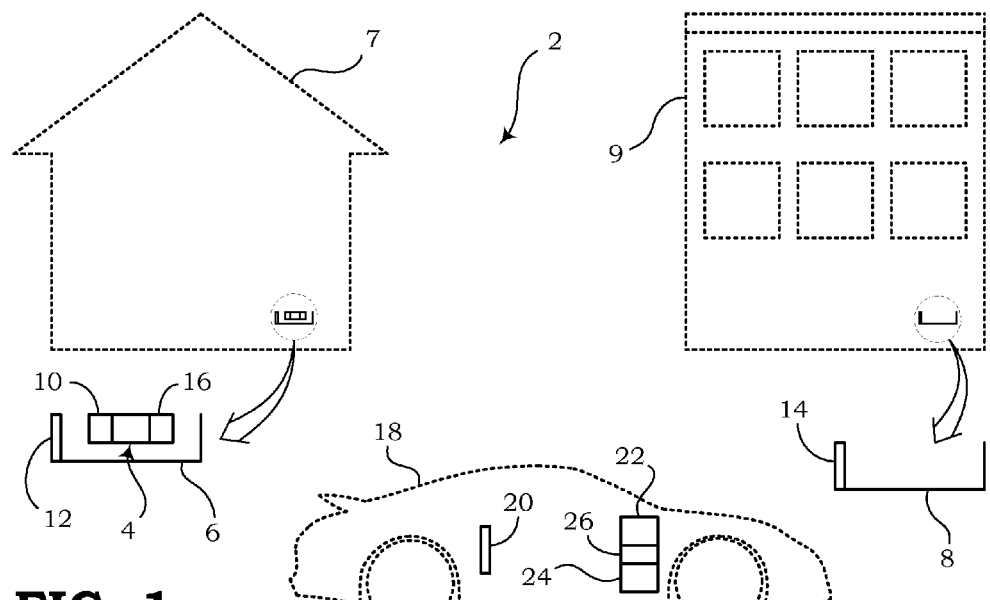
FIGS. 1a, 1b, 1c and 1d are schematic representations of a system according to the invention for performing different steps of a method of the invention.

A system according to the invention is identified by the numeral 2 in FIGS. 1a, 1b, 1c and 1d and comprises a use module 4 and first and second spatially distributed storage devices 6, 8 for the use module 4. The use module 4, in this case, is a mobile telephone. The first storage device 6 is allocated to a first stationary device 7, and the second storage device 8 is allocated to a second stationary device 9.

The use module 4 has a recognition interface 10, and each of the two storage devices 6, 8 similarly has a recognition interface 12, 14. The use module 4 also has a communication module 16 that is used as a shared, second communication module 16 for the use module 4 and the two storage devices 6, 8 for the use module 4.

FIGS. 1a to 1d also show a motor vehicle 18 that is controlled by the system 2 of the invention and in accordance with the method according to the invention. The motor vehicle 18 comprises a recognition interface 20 and a first communication module 22 that can be designed as components of the system 2 of the invention. Furthermore, the motor vehicle 18 comprises an air conditioning system 24 with a control device 26 that can control a function of the air conditioning system 24 and therefore of the motor vehicle 18.

Figure 1B:
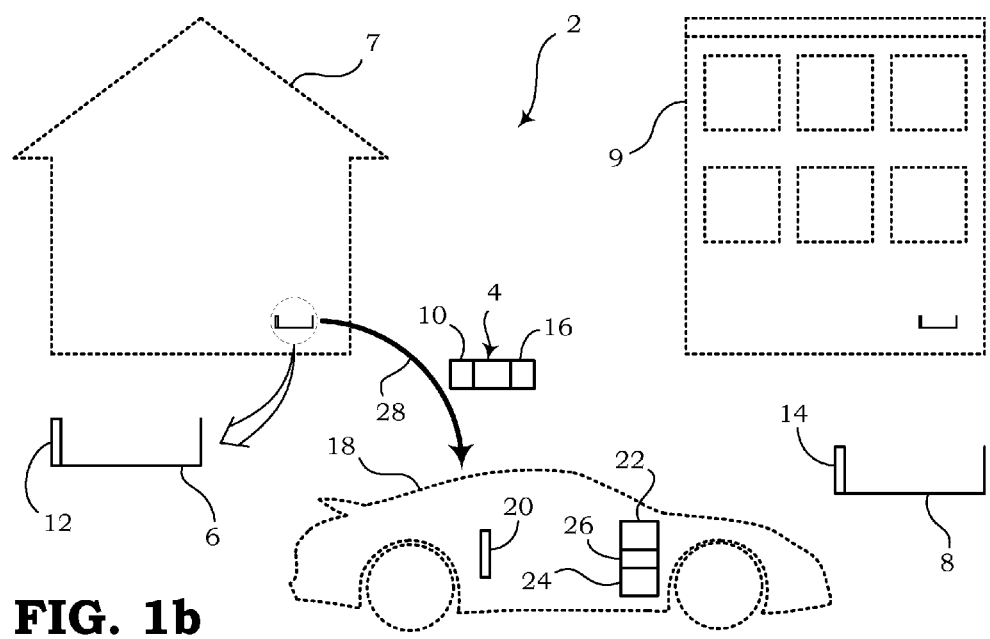

The use module 4 can be disposed at different locations. FIG. 1a shows explicitly that the use module 4 is disposed in the first storage device 6. FIG. 1b shows how the use module 4, during a first change of storage location 28 (curved arrow), is taken by the user from the first storage device 6 to the motor vehicle 18, as shown in FIG. 1c, the use module 4 is disposed in the motor vehicle 18 so that the motor vehicle 18 becomes a further storage location of the use module 4.

Figure 1C:
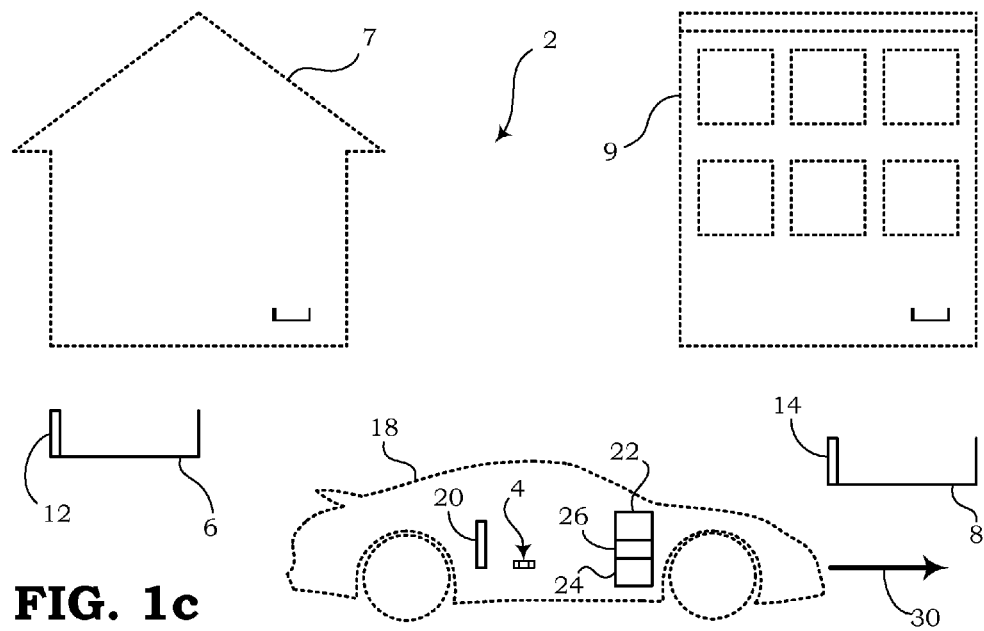
Figure 1D:
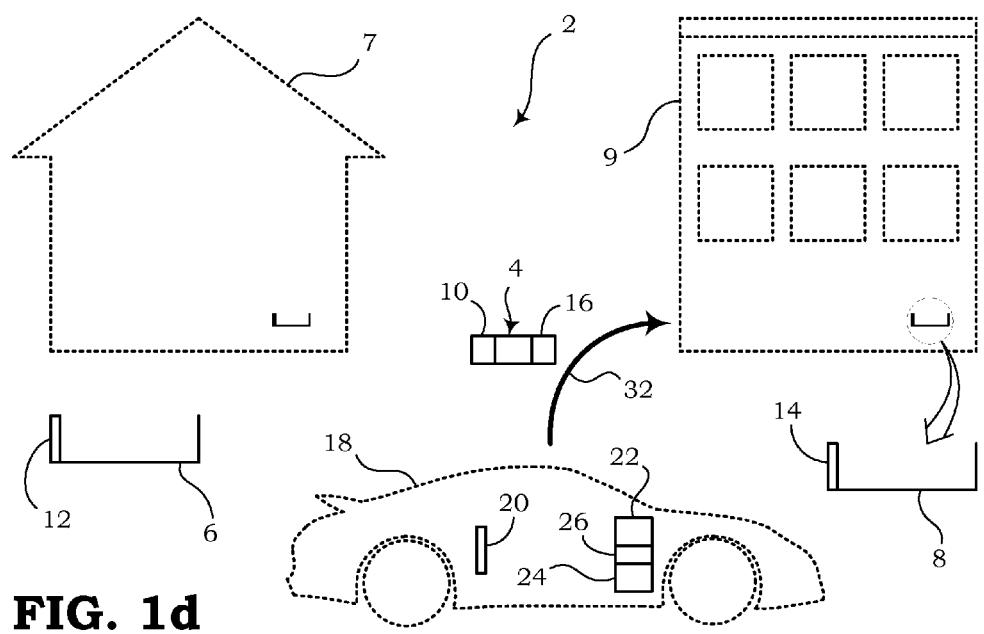

The arrow 30 in FIG. 1c shows that the motor vehicle 18 is driven by the user with the use module 4 disposed therein from a first stationary device 7 at which the first storage device 6 is disposed to a second stationary device 9 at which the second storage device 8 is disposed. FIG. 1d shows how the use module 4 is removed by the user from the motor vehicle 18 and is disposed in the second storage device 8. A second change of storage location 32 associated therewith is similarly indicated here by a curved arrow. The use module 4 can thus be disposed at different storage devices 6, 8 and in the motor vehicle 18 as a further storage location.

The use module 4 is registered in terms of its position in each case as disposed at a storage device 6, 8 or in the motor vehicle 18, or is deemed to be disposed there when the recognition interface 10 of the use module 4 makes contact with one of the recognition interfaces 12, 14, 20 of one of the storage devices 6, 8 or of the motor vehicle 18 as a further storage location. The recognition interface 10 makes contact with one of the other recognition interfaces 12, 14, 20 through exchange of electromagnetic waves. The electromagnetic waves that are exchanged between the recognition interface 10 of the use module 4 and one of the other recognition interfaces 12, 14, 20 have a defined range. Thus, a strength of a signal exchanged between the recognition interface 10 of the use module 4 and the further recognition interfaces 12, 14, 18 has a minimum strength within the defined or provided range. If the recognition interface 10 of the use module 4 has a distance to one of the other recognition interfaces 12, 14, 20 which is at most as great as a minimum distance defined by the range of the electromagnetic waves and/or by the minimum strength of the signal, the use module 4 is deemed to be allocated to a respective storage device 6, 8 or to the vehicle 18, and hence the use module 4 is considered to be disposed at and/or in the respective storage device 6, 8 or the motor vehicle 18.

A storage location may change 28, 30, 32 due to a movement of the use module 4 associated therewith. Thus, the distance between the recognition interface 10 of the use module 4 and one of the other recognition interfaces 12, 14, 20, to which the distance hitherto had at most the minimum distance, becomes greater than the provided minimum distance. As a result, during the change of storage location 28, 32, the use module 4 is not allocated to any of the storage devices 6, 8 or to the motor vehicle 18 as a further storage location.

As shown in FIG. 1b, as soon as the recognition interface 10 of the use module 4 registers that the distance from the use module 4 to the recognition interface 12 of the first storage device 6 at which the use module 4 had hitherto (FIG. 1a) been disposed becomes greater than the minimum distance, a message with an instruction to perform at least one function of the motor vehicle 18 is transferred from the second communication module 16 of the use module 4 to the first communication module 22 of the motor vehicle 18. In this embodiment, the air conditioning system 24 of the motor vehicle 18 is activated by the control device 26 according to the instruction in the received message, so that a passenger compartment of the motor vehicle 18 has a temperature required by the user by the time the user, during the first change of storage location 28, has reached the motor vehicle 18 with the use module 4.

After the user, on the journey with the motor vehicle 18 and the use module 4 disposed therein (FIG. 1c), has reached the second stationary location 9 and has parked the vehicle 18 there, the user transports the use module 4 during a further change of storage location 32 out of the motor vehicle 18 to the second storage device 8. During this change of storage location 32, a distance between the recognition interface 10 and one of the further recognition interfaces 12, 14, 20 is greater than the minimum distance provided for this purpose. Thus, the use module 4 similarly is not allocated during the second change of storage location 32 to any of the storage devices 6, 8, nor to the motor vehicle 18, as a further storage location. The use module 4 is not deemed to be allocated to the second storage device 8 until the distance between the recognition interface 10 of the use module 4 and the recognition interface 14 of the second storage device 8 is at most as great as the minimum distance provided for this purpose.

After this second change of storage location 32 is registered, a message similarly comprising an instruction to perform a function of the motor vehicle 18 to be performed at a future time similarly is transferred from the second communication module 16 of the use module 4 to the first communication module 22 of the motor vehicle 18.

What is claimed is:

1. A method for controlling a function of a motor vehicle, the method comprising the steps of:
   providing a motor vehicle, a first storage device, and a portable use module, the motor vehicle configured to include a first communication module, and the first storage device being assigned to a first stationary location that is separate from the motor vehicle;
   providing a second communication module in at least one of the first storage device and the portable use module;
   sensing whether the portable use module is within a predefined range of the first storage device;
   after sensing that the portable use module is within a predefined range of the first storage device, sensing when the portable use module is moved out of the predefined range of the first storage device; and
   transmitting a control signal from the second communication module to the first communication module when the portable use module is moved out of the predefined range of the first storage device;
   wherein the control signal includes an instruction to control a function of the motor vehicle.

2. The method of claim 1, further comprising the steps of:
   providing a first recognition interface in the first storage device;
   providing a second recognition interface in the portable use module; and
   sensing the proximity of the portable use module to the first storage device when the first recognition interface communicates with the second recognition interface.

3. The method of claim 1, wherein sensing when the portable use module is moved out of the predefined range of the first storage device includes the step of registering a change of storage location for the portable use module.

4. The method of claim 1, further comprising the step of providing a second storage device in the motor vehicle.

5. The method of claim 1, wherein the function of the motor vehicle includes at least one of switching on an air conditioning system of the motor vehicle, switching on a heating system of the motor vehicle, and charging an electrical energy store of an electric motor of the motor vehicle.

6. The method of claim 1, further comprising the steps of:
   providing a second storage device being assigned to a second stationary location that is separate from the motor vehicle; and
   providing a third communication module in at least one of the second storage device and the portable use module.

7. The method of claim 2, wherein sensing the proximity of the portable use module to the first storage device includes the step of sensing when the second recognition interface makes contact with the first recognition interface.

8. The method of claim 2, wherein sensing the proximity of the portable use module to the first storage device includes the step of sensing the exchange of electromagnetic waves between the first recognition interface and the second recognition interface.

9. The method of claim 2, wherein sensing when the portable use module is moved out of the predefined range of the first storage device further includes the step of sensing when the portable use module is transported past the first storage device and the first recognition interface and second recognition interface communicate with each other for at least a predefined time period.

10. The method of claim 3, wherein the change of storage location includes a first state when the portable use module is positioned at the first storage device assigned to the first stationary location and a second state when the portable use module is positioned within the motor vehicle.

11. The method of claim 3, further comprising the step of determining a time at which the change of storage location is carried out.

12. The method of claim 3, further comprising the step of predefining a type of function to be controlled on the motor vehicle depending on at least one characteristic of the change of storage location.

13. The method of claim 3, further comprising the step of predefining a time when the function of the motor vehicle is to be controlled depending on at least one characteristic of the change of storage location.

14. The method of claim 6, further comprising the steps of:
   after sensing that the portable use module is within a predefined range of the second storage device, sensing when the portable use module is moved out of the predefined range of the second storage device; and
   transmitting a control signal from the third communication module to the first communication module when the portable use module is moved out of the predefined range of the second storage device;
   wherein the control signal includes an instruction to control a function of the motor vehicle.

15. A system for controlling a function of a motor vehicle, the system comprising:
   a first communication module configured within the motor vehicle;
   a first storage device allocated to a first stationary location that is separate from the motor vehicle;
   a portable use module;
   a second communication module configured in at least one of the first storage device and the portable use module; and a recognition device configured to sense when the portable use module is within a predefined range of the first storage device and to sense when the portable use module is moved out of the predefined range of the first storage device;

wherein the second communication module is configured to transmit a control signal to the first communication module when the recognition device senses that the portable use module has been moved out of the predefined range of the first storage device; and wherein the control signal includes an instruction to control a function of the motor vehicle.

16. The system of claim 15, wherein the recognition device includes a first recognition interface in the first storage device and a second recognition interface in the portable use module, and wherein the first and second recognition interfaces communicate with each other to sense the proximity of the portable use module to the first storage device.

17. The system of claim 15, wherein the first stationary location is one of a house, a workplace, and a passageway.

18. The system of claim 15, further comprising a second storage device disposed in the motor vehicle.

19. The system of claim 15, wherein the function of the motor vehicle includes at least one of switching on an air conditioning system of the motor vehicle, switching on a heating system of the motor vehicle, and charging an electrical energy store of an electric motor of the motor vehicle.

20. The system of claim 15, wherein the portable use module is configured as one of a mobile phone, a smartphone, and a key associated with the motor vehicle.

21. The system of claim 16, wherein the first and second recognition interfaces are configured to make contact with each other via a mechanical connection.

22. The system of claim 16, wherein the first and second recognition interfaces are configured to exchange electromagnetic waves with each other.

23. The system of claim 18, further comprising a third storage device allocated to a second stationary location that is separate from the motor vehicle.

24. The system of claim 23, further comprising a third communication module disposed in at least one of the third storage device and the portable use module.

25. A method for controlling a function of a motor vehicle, the method comprising the steps of:

providing a motor vehicle, a first storage device, and a portable use module, the motor vehicle having an electric motor as a drive device for the motor vehicle and including a first communication module, and the first storage device being assigned to a first stationary location that is separate from the motor vehicle;

providing a second communication module in at least one of the first storage device and the portable use module;

sensing whether the portable use module is within a predefined range of the first storage device;

after sensing that the portable use module is within a predefined range of the first storage device, sensing when the portable use module is moved out of the predefined range of the first storage device; and transmitting a control signal from the second communication module to the first communication module when the portable use module is moved out of the predefined range of the first storage device;

wherein the control signal includes an instruction to control a function of the motor vehicle.

* * * * *